United States Patent
Ebisui et al.

(10) Patent No.: US 12,311,582 B2
(45) Date of Patent: May 27, 2025

(54) METHOD FOR PRODUCING EXPANDED PARTICLES

(71) Applicant: KANEKA CORPORATION, Osaka (JP)

(72) Inventors: Masahide Ebisui, Osaka (JP); Yasuhiro Iwata, Osaka (JP)

(73) Assignee: KANEKA CORPORATION, Osaka (JP)

( * ) Notice: Subject to any disclaimer, the term of this patent is extended or adjusted under 35 U.S.C. 154(b) by 392 days.

(21) Appl. No.: 17/731,260

(22) Filed: Apr. 28, 2022

(65) Prior Publication Data

US 2022/0250290 A1  Aug. 11, 2022

Related U.S. Application Data

(63) Continuation of application No. PCT/JP2020/036827, filed on Sep. 29, 2020.

(30) Foreign Application Priority Data

Nov. 29, 2019  (JP) .................................. 2019-217142

(51) Int. Cl.
   B29C 44/34 (2006.01)
   B29C 44/44 (2006.01)
   (Continued)

(52) U.S. Cl.
   CPC ...... B29C 44/3461 (2013.01); B29C 44/3426 (2013.01); B29C 44/445 (2013.01);
   (Continued)

(58) Field of Classification Search
   CPC ............ B29C 44/3461; B29C 44/3465; B29C 44/3469
   See application file for complete search history.

(56) References Cited

U.S. PATENT DOCUMENTS

| | | | | |
|---|---|---|---|---|
| 3,671,026 A | * | 6/1972 | Mills ................... | B29C 44/3461 425/4 R |
| 4,676,739 A | * | 6/1987 | Train .................. | B29C 44/3461 361/33 |

(Continued)

FOREIGN PATENT DOCUMENTS

| | | |
|---|---|---|
| CN | 103429649 A | 12/2013 |
| CN | 105008443 A | 10/2015 |

(Continued)

OTHER PUBLICATIONS

International Search Report issued in corresponding International Application No. PCT/JP2020/036827, mailed on Dec. 8, 2020 (6 pages).

(Continued)

*Primary Examiner* — Xiao S Zhao
*Assistant Examiner* — Nicholas J Chidiac
(74) *Attorney, Agent, or Firm* — Osha Bergman Watanabe & Burton LLP

(57) ABSTRACT

A method for producing expanded particles having a high expansion ratio by a pressure-release expansion with a simpler configuration and at a low facility cost is provided. A production device includes an expansion cylinder being provided with a connecting port that connects with open-system branch cylinder and having a space of a saturated steam atmosphere. The space of a saturated steam atmosphere may be a different space from a space inside the branch cylinder. A temperature (T1) inside the expansion chamber exceeds 102° C. and is not higher than a higher one of 108° C. and a temperature obtained by a melting point Tm of a thermoplastic resin minus 14° C. A temperature (T2) at a connecting port is not lower than 100° C., and the temperature (T1) is higher than the temperature (T2).

6 Claims, 4 Drawing Sheets

(51) Int. Cl.
    *B29K 101/12*     (2006.01)
    *B29K 105/04*     (2006.01)
    *C08J 9/18*     (2006.01)

(52) U.S. Cl.
    CPC ............. *C08J 9/18* (2013.01); *B29K 2101/12* (2013.01); *B29K 2105/048* (2013.01); *B29K 2995/0041* (2013.01); *C08J 2201/0502* (2013.01); *C08J 2300/22* (2013.01)

(56) References Cited

U.S. PATENT DOCUMENTS

| | | | |
|---|---|---|---|
| 4,685,872 A * | 8/1987 | Erlenbach | B29C 44/3461 425/149 |
| 4,778,829 A | 10/1988 | Ichimura et al. | |
| 6,403,662 B2 * | 6/2002 | Chung | C08J 9/18 521/142 |
| 6,476,088 B1 * | 11/2002 | Chung | C08J 9/18 521/60 |
| 6,506,807 B1 * | 1/2003 | Yanagihara | C08J 9/0061 521/58 |
| 6,593,383 B2 * | 7/2003 | Yanagihara | C08L 23/10 521/58 |
| 2001/0021725 A1 * | 9/2001 | Chung | B29C 44/206 521/56 |
| 2002/0198270 A1 * | 12/2002 | Yanagihara | C08J 9/18 521/50 |
| 2014/0005287 A1 | 1/2014 | Itoi | |
| 2016/0009887 A1 | 1/2016 | Fukuzawa | |
| 2016/0304693 A1 | 10/2016 | Itoi | |
| 2019/0030768 A1 | 1/2019 | Hayase et al. | |
| 2021/0146580 A1 * | 5/2021 | Nordin | B01J 13/20 |

FOREIGN PATENT DOCUMENTS

| | | |
|---|---|---|
| EP | 1182225 A1 | 2/2002 |
| JP | S63-043935 A | 2/1988 |
| JP | H05-255531 A | 10/1993 |
| JP | 2000290420 A * | 10/2000 |
| JP | 2003-192820 A | 7/2003 |
| JP | 6547628 B2 | 7/2019 |
| WO | 2013/031745 A1 | 3/2013 |
| WO | 2017/169568 A1 | 10/2017 |
| WO | 2019/187986 A1 | 10/2019 |
| WO | 2020/158061 A1 | 8/2020 |

OTHER PUBLICATIONS

Written Opinion issued in corresponding International Application No. PCT/JP2020/036827, mailed on Dec. 8, 2020 (8 pages).
Office Action issued in corresponding Chinese Application No. 202080060220.7 dated Nov. 30, 2022 (16 pages).
Extended European Search Report issued in European Application No. 20891780.7 mailed Nov. 22, 2023 (9 pages).
Notice of Reasons for Refusal issued in corresponding Japanese Patent Application No. 2021-561189, mailed Mar. 4, 2025 (5 pages).

* cited by examiner

METHOD FOR PRODUCING EXPANDED PARTICLES

TECHNICAL FIELD

One or more embodiments of the present invention relate to a device and method for producing expanded particles.

BACKGROUND

It is known that thermoplastic resin expanded particles (hereinafter may be referred to simply as "expanded particles") are produced by a pressure-release expansion method. In the pressure-release expansion method, thermoplastic resin particles are dispersed into water containing a dispersing agent in a pressure-resistant vessel, a blowing agent is then added thereto, a high temperature and high pressure is kept to impregnate the thermoplastic resin particles with the blowing agent, and, thereafter, the thermoplastic resin particles are expelled into a low pressure atmosphere.

For example, Patent Literature 1 discloses the technique for producing polyethylene-based resin expanded particles by a pressure-release expansion method. It is considered that a device for producing expanded particles described in Patent Literature 1 cannot be used in an actual production facility and is used for so-called laboratory-scale production.

Further, Patent Literature 2 discloses the technique for producing polyolefin-based resin expanded particles by a pressure-release expansion method. Patent Literature 2 discloses a device for producing expanded particles on a scale used in an actual production facility, not on a laboratory scale. The production device disclosed in Patent Literature 2 includes a pressure-resistant vessel, a delivery valve, a nozzle, a separator, and an expanded particle storage tank. The pressure-resistant vessel, the delivery valve, the nozzle, the separator, and the expanded particle storage tank are connected by transport piping. When the delivery valve is opened, the thermoplastic resin particles impregnated with the blowing agent in the pressure-resistant vessel are expelled into the nozzle having a low pressure atmosphere. Then, as a result, the thermoplastic resin particles are expanded, so that expanded particles are produced. The expanded particles thus produced are transported through the transport piping, passes through the separator, and are stored in the expanded particle storage tank. In the production device disclosed in Patent Literature 2, an area of the piping and facility through which the expanded particles are transported from an outlet of the nozzle to the expanded particle storage tank is assumed to be an expansion chamber.

PATENT LITERATURES

[Patent Literature 1]
  Japanese Patent No. 6547628
[Patent Literature 2]
  PCT International Publication No. WO2019/187986

Unfortunately, the conventional technique as described above has room for improvement in producing expanded particles having a high expansion ratio by an actual production facility.

According to the study conducted by the inventors of one or more embodiments of the present invention, it has been shown that, in the method for producing expanded particles by a pressure-release expansion method, expelling thermoplastic resin particles impregnated with a blowing agent into a high temperature steam atmosphere (saturated steam atmosphere) makes it possible to produce expanded particles having a high expansion ratio. Meanwhile, the inventors of one or more embodiments of the present invention have found that, when an expansion atmosphere in which the thermoplastic resin particles are expanded is set to a high temperature steam atmosphere in order to obtain expanded particles having a high expansion ratio, the production device (production facility) disclosed in Patent Literature 2 has the following problem. That is, in the production device disclosed in Patent Literature 2, in order to realize a high temperature steam atmosphere, it is necessary to increase a steam partial pressure by configuring, as a closed system, the entire area (system including the separator, etc.) of the piping and facility through which expanded particles are transported from the outlet of the nozzle to the expanded particle storage tank. Thus, in order to configure the entire device as a closed system, the configuration of the device becomes complicated.

SUMMARY

One or more embodiments of the present invention produce expanded particles having a high expansion ratio by a pressure-release expansion method with a simpler configuration and at a low facility cost.

A production device in accordance with an aspect of one or more embodiments of the present invention is a device for producing expanded particles, including: a pressure-resistant vessel for impregnating crystalline thermoplastic resin particles with a blowing agent; an expansion chamber having a pressure lower than an internal pressure of the pressure-resistant vessel; and open-system transport piping that transports the expanded particles, the expansion chamber being provided with a connecting port that connects with the transport piping and having a space of a saturated steam atmosphere, the space being a different space from a space inside the transport piping, wherein a first temperature inside the expansion chamber exceeds 102° C. and is not higher than a higher one of 108° C. and a temperature obtained by a melting point Tm of a thermoplastic resin minus 14° C., a second temperature at the connecting port is not lower than 100° C., and the first temperature is higher than the second temperature.

Further, a production method in accordance with an aspect of one or more embodiments of the present invention is a method for producing expanded particles, including: an impregnation process of impregnating crystalline thermoplastic resin particles with a blowing agent in a pressure-resistant vessel under a condition where heat and pressure are applied; an expansion process of expelling the blowing agent-impregnated thermoplastic resin particles obtained in the impregnation process into an expansion chamber having a pressure lower than an internal pressure of the pressure-resistant vessel, so that expanded particles are obtained; and a transport process of transporting the expanded particles through open-system transport piping, the expansion chamber being provided with a connecting port that connects with the transport piping and having a space of a saturated steam atmosphere, the space being a different space from a space inside the transport piping, wherein a first temperature inside the expansion chamber exceeds 102° C. and is not higher than a higher one of 108° C. and a temperature obtained by a melting point Tm of a thermoplastic resin minus 14° C., a second temperature at the connecting port is not lower than 100° C., and the first temperature is higher than the second temperature.

Advantageous Effects of Invention

According to an aspect of one or more embodiments of the present invention, it is possible to produce expanded particles having a high expansion ratio by a pressure-release expansion method with a simpler configuration and at a low facility cost.

DETAILED DESCRIPTION

Embodiment 1

Figure 1:
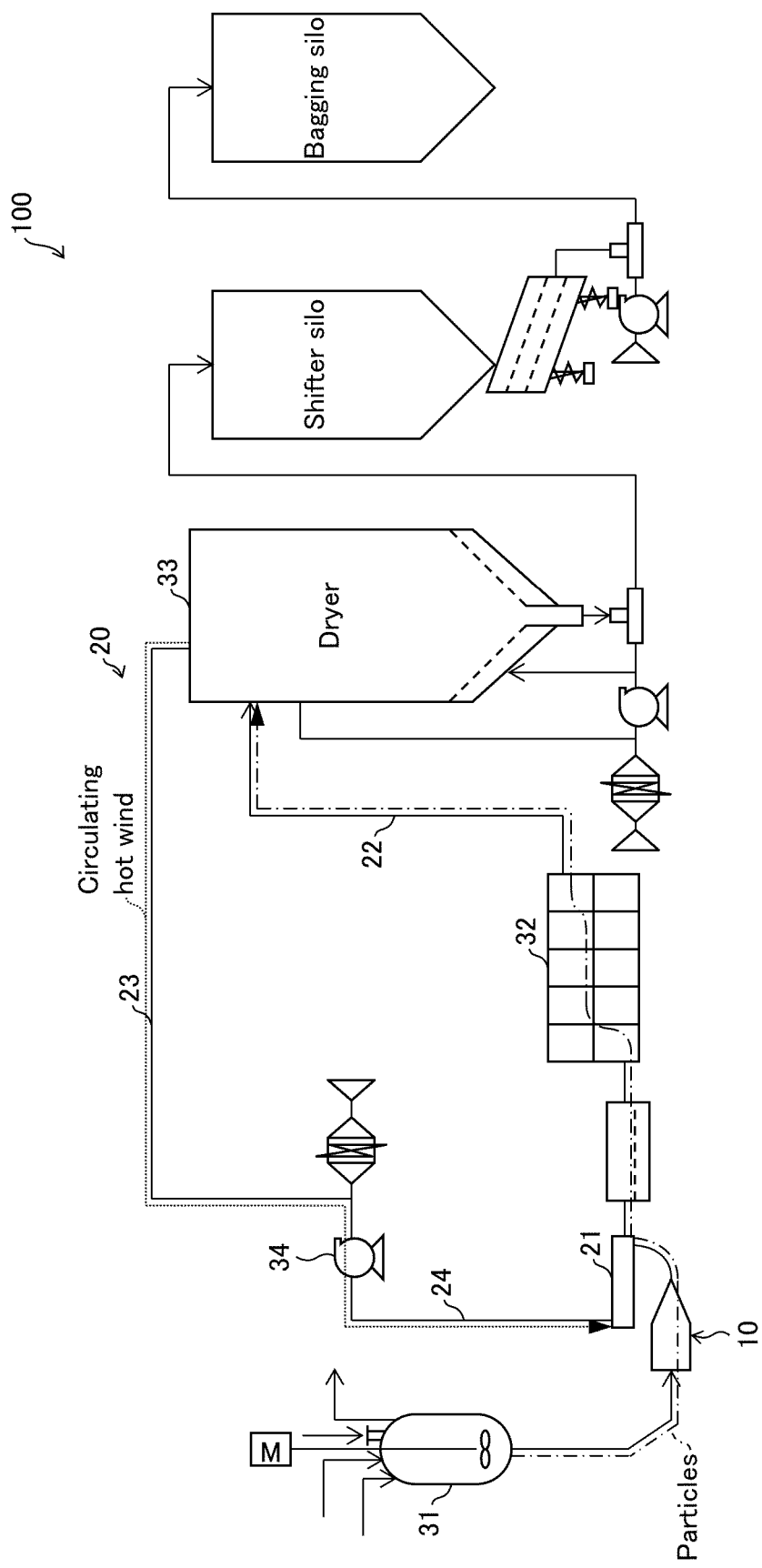
FIG. 1 is a view schematically illustrating a configuration of a device for producing expanded particles in accordance with one or more embodiments of the present invention.

The following will describe details of one or more embodiments of the present invention. FIG. 1 is a view schematically illustrating a configuration of a device 100 for producing expanded particles in accordance with one or more embodiments. The production device as used herein is not intended as a production device used at the laboratory level, but is intended as a production device used in, for example, an actual production factory for expanded particles. Thus, the production device in one or more embodiments can be said to be a production facility or a production plant.

As illustrated in FIG. 1, the production device 100 includes an expansion cylinder 10 (expansion chamber), a pressure-resistant vessel 31, a dehydrator 32, a dryer 33, a transport blower 34, a shifter silo, and a bagging silo. Further, the production device 100 includes a transport wind circulation line 20 that circulates transport wind through the dehydrator 32, the dryer 33, and the transport blower 34. The transport wind circulation line 20 is configured by an open system.

The "open system" means a configuration such that in order to realize a steam-based high temperature expansion atmosphere, the entire area (system including the dehydrator, etc.) of the piping and facility through which expanded particles are transported from the outlet of the nozzle to the dryer 33 is not a closed system for increasing a steam partial pressure. The "open system" is, for example, a system in which at least one of transport piping, such as a transport wind circulation line 20, and various constituent members connected to the transport piping is open from outside.

The transport wind circulation line 20 includes a branch cylinder 21, a transport pipe 22, a transport pipe 23, and a transport pipe 24. The transport pipe 22 is piping that connects the dehydrator 32 and the dryer 33. The transport pipe 23 is piping that connects the dryer 33 and the transport blower 34. The transport pipe 24 is piping that connects the transport blower 34 and the branch cylinder 21. Further, the expansion cylinder 10 is connected to the branch cylinder 21. In the transport wind circulation line 20, moist hot wind in the dryer 33 is sucked into the transport pipe 23 by the transport blower 34. Then, the moist hot wind passes through the transport pipe 24, the branch cylinder 21, and the transport pipe 22, and flows into the dryer 33 again. With the transport wind circulation line 20 provided in this manner, the production device 100 utilizes the moist hot wind in the dryer 33 for transport of the expanded particles, so that the effects of energy saving and prevention of bead shrinkage are obtained.

The pressure-resistant vessel 31 is a vessel for producing expanded particles by a pressure-release expansion method. In the pressure-resistant vessel 31, an aqueous dispersion slurry containing crystalline thermoplastic resin particles (hereinafter may be referred to simply as "resin particles"), an inorganic dispersion agent, and a dispersion auxiliary and a blowing agent are charged together with water. Then, the inside of the pressure-resistant vessel 31 is heated and maintained at a constant pressure and at a constant temperature, so that the resin particles are impregnated with the blowing agent. The resin particles impregnated with the blowing agent are expelled into the expansion cylinder 10 having a low pressure atmosphere (pressure-release expansion method) to become expanded particles.

The expanded particles in the expansion cylinder 10 are transported to the branch cylinder 21, and are transported from the branch cylinder 21 to the dehydrator 32. The expanded particles are dehydrated by the dehydrator 32. After that, the expanded particles pass through the transport pipe 22 and are dried by the dryer 33. Provided at stages subsequent to the dryer 33 are the shifter silo and the bagging silo. The expanded particles are delivered to the shifter silo, are classified by sieves, and are then stored in the bagging silo.

Figure 2:
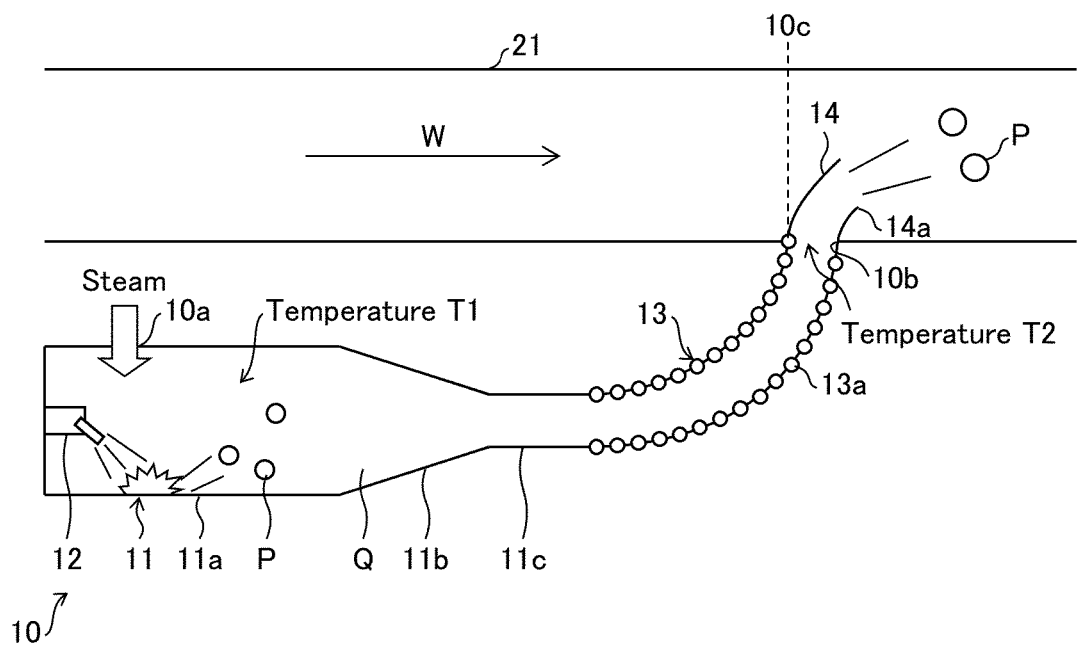
FIG. 2 is a cross-sectional view schematically illustrating a configuration of an expansion cylinder provided in the production device in accordance with one or more embodiments of the present invention.

FIG. 2 is a cross-sectional view schematically illustrating a configuration of the expansion cylinder 10 provided in the production device 100 in accordance with one or more embodiments. As illustrated in FIG. 2, the expansion cylinder 10 has a steam inlet 10a and a connecting port 10b. The steam inlet 10a is configured such that steam is injected from a direction intersecting an axis of the expansion cylinder 10. The connecting port 10b is an opening that connects the expansion cylinder 10 and the branch cylinder 21. That is, the expansion cylinder 10 connects with the branch cylinder 21 via the connecting port 10b. The expansion cylinder 10 has a space Q having a saturated steam atmosphere. This space Q of the saturated steam atmosphere is a different space from a space inside the branch cylinder 21.

Further, the expansion cylinder 10 includes a cylinder body 11, an orifice plate equipped with tubes 12 (particle expelling section), connection piping 13, and a guide pipe 14.

The cylinder body 11 has a large-diameter cylinder part 11a, a reducer part 11b (reducer part), and a small-diameter cylinder part 11c. The reducer part 11b is a part that connects the large-diameter cylinder part 11a and the small-diameter cylinder part 11c. Further, the large-diameter cylinder part 11a, the reducer part 11b, and the small-diameter cylinder part 11c are connected so as to be coaxial with each other. Further, the reducer part 11b is configured such that a distance between side walls of the reducer part 11b facing each other decreases with increasing proximity to the connecting port 10b.

The orifice plate 12 is provided in the large-diameter cylinder part 11a of the cylinder body 11. The orifice plate 12 is provided on the opposite side of the expansion cylinder 10 from the connecting port 10b. That is, the orifice plate 12 is disposed in the expansion cylinder 10 at a position farthest from the connecting port 10b. The orifice plate 12 includes a cylindrical body. The resin particles impregnated with the blowing agent are expelled from the cylindrical body of the orifice plate 12 to become expanded particles P. Here, the orifice plate 12 serving as the particle expelling section is configured to expel the resin particles so that the resin particles impregnated with the blowing agent collide with a side wall surface of the expansion cylinder 10. The cylindrical body of the orifice plate 12 may be disposed so as to be inclined with respect to the axis of the expansion cylinder 10. Thus, when the resin particles impregnated with the blowing agent are expelled from the cylindrical body of the orifice plate 12, the resin particles collide with a side wall surface of the large-diameter cylinder part 11a. Thus, since expanded cells are formed by an impactive force caused by the collision of the resin particles impregnated with the blowing agent with the side wall surface of the large-diameter cylinder part 11a, the individual expanded particles P are uniformly expanded. This makes it possible to reduce variations in expansion ratio. In the configuration illustrated in FIG. 2, the cylindrical body of the orifice plate 12 is disposed so as to be inclined with respect to the axis of the expansion cylinder 10. However, the disposition of the cylindrical body of the orifice plate 12 is not limited to the disposition illustrated in FIG. 2.

Further, in the expansion cylinder 10, the steam inlet 10a is provided in the vicinity of the orifice plate 12. In other words, in the expansion cylinder 10, the steam inlet 10a is provided at a position opposite to the connecting port 10b. Further, in the large-diameter cylinder part 11a, the steam inlet 10a and the orifice plate 12 are provided on the opposite side from the reducer part 11b.

The connection piping 13 is piping that connects the small-diameter cylinder part 11c of the cylinder body 11 and the branch cylinder 21. The connection piping 13 and the branch cylinder 21 connect with each other via the connecting port 10b. The expansion cylinder 10 includes an uneven surface 13a on at least an inner wall of the connection piping 13. Examples of the connection piping 13 having such a configuration include a flexible hose. The flexible hose has an inner wall surface that is constituted by an uneven surface so that the flexible hose is bendable.

The guide pipe 14 is provided in the branch cylinder 21. The guide pipe 14 connects with the connection piping 13 via the connecting port 10b. As illustrated in FIG. 2, the guide pipe 14 has a discharge port 14a for the expanded particles P and stands on the inner wall surface of the branch cylinder 21. Furthermore, the guide pipe 14 is disposed so as to prevent transport wind W from flowing into the discharge port 14a. For example, the guide pipe 14 has a structure in which a portion of the guide pipe 14 that makes contact with the transport wind W is downstream from a most upstream position 10c of the connecting port 10b. Such a configuration allows the expanded particles P discharged through the discharge port 14a of the guide pipe 14 to be easily transported along the flow of the transport wind W. That is, it is possible to prevent the expanded particles P from reflowing into the expansion cylinder 10 due to the transport wind W.

Further, the discharge port 14a may be such that the diameter of the discharge port 14a is smaller than the diameter of the connecting port 10b. This allows a flow velocity of a combination of a jet flow caused by the expansion at the discharge port 14a and the injected steam to be regulated so as to be higher than a flow velocity of the transport wind W, and allows the transport wind W to be prevented from flowing into the connecting port 10b and the expansion cylinder 10.

Steam is injected into the expansion cylinder 10 through the steam inlet 10a. The space Q inside the expansion cylinder 10 is a space of a saturated steam atmosphere. The temperatures in the space Q are controlled to fall under the following conditions (i) to (iii). (i) A temperature T1 (first temperature) inside the expansion cylinder 10 exceeds 102° C. and is not higher than a higher one of 108° C. and a temperature obtained by a melting point Tm of the thermoplastic resin minus 14° C. (ii) A temperature T2 (second temperature) at the connecting port 10b is not lower than 100° C. (iii) The temperature T1 is higher than the temperature T2. With the temperatures T1 and T2 falling within the above ranges, it is possible to obtain the expanded particles P having a high expansion ratio. The expansion ratio of the obtained expanded particles P is not less than 10 times, preferably not less than 11 times, and more preferably not less than 13 times.

Note here that, regarding the above condition (i), the melting point Tm of the thermoplastic resin is a value measured by differential scanning calorimetry. Specifically, (a) 5 mg to 6 mg of the thermoplastic resin having a temperature of 40° C. is heated to 220° C. at a temperature increase rate of 10° C./minute, so that the thermoplastic resin is melted; (b) thereafter, the thermoplastic resin having a temperature of 220° C. is cooled to 40° C. at a temperature decrease rate of 10° C./minute, so that the thermoplastic resin crystalizes; (c) further, the thermoplastic resin having a temperature of 40° C. is heated to 220° C. at a temperature increase rate of 10° C./minute. The melting point Tm is a value of a melting peak temperature during the second temperature increase that is determined as a melting point from a DSC curve obtained by these operations (a) through (c).

For example, in a case where the thermoplastic resin is polyethylene (PE), the melting point Tm is 122° C. to 128° C., depending on the type of polyethylene. The melting point Tm minus 14° C. is 108° C. to 114° C. Therefore, the temperature T1 inside the expansion cylinder 10 is controlled so as to be a temperature that exceeds 102° C. and that is not higher than any temperature in a range of 108° C. to 114° C. Note that an upper limit of the temperature T1 is set as appropriate according to the type of polyethylene. More specifically, in a case where the melting point Tm of polyethylene (PE) is 122° C., the temperature T1 inside the expansion cylinder 10 is controlled so as to be a temperature that exceeds 102° C. and is not higher than 108° C. More preferably, the temperature T1 is controlled so as to be a temperature of 103° C. to 105° C.

For example, in a case where the thermoplastic resin is polypropylene (PP), the melting point Tm is 136° C. to 155° C., depending on the type of polypropylene. The melting point Tm minus 14° C. is 122° C. to 141° C. Therefore, the temperature T1 inside the expansion cylinder 10 is controlled so as to be a temperature that exceeds 102° C. and that is not higher than any temperature in a range of 122° C. to 141° C. Note that an upper limit of the temperature T1 is set as appropriate according to the type of polypropylene.

Further, regarding the above condition (ii), more preferably, the temperature T2 is controlled so as to be a temperature of 100° C. to 103° C. For example, a difference between the temperature T1 and the temperature T2 may be 0° C. to 3° C.

Further, since the temperature T1 is higher than the temperature T2 as in the above condition (iii), the saturated steam pressure inside the expansion cylinder 10 is higher than the saturated steam pressure at the connecting port 10b. Thus, saturated steam inside the expansion cylinder 10 flows toward the connecting port 10b. Note, however, that since the difference between the temperature T1 and the temperature T2 is not more than 6° C., the saturated steam is built up inside the expansion cylinder 10. The resin particles impregnated with the blowing agent are expelled into such an atmosphere that the saturated steam is built up. Thus, generated expanded particles P have a high expansion ratio.

Note, here, that a location at which the temperature T1 is measured only needs to be a location at which a typical temperature inside the expansion cylinder 10 is measured and a location far from the connecting port 10b, and can be set as appropriate according to the shape of the expansion cylinder 10. For example, in a case where the expansion cylinder 10 has the structure illustrated in FIG. 2, the location at which the temperature T1 is measured is in the vicinity of the orifice plate 12. More specifically, the location at which the temperature T1 is measured is a location such that a distance from the orifice plate 12 is 50 mm to 140 mm and a distance from the connecting port 10b is 2000 mm to 3000 mm. Further, the location at which the temperature T1 is measured may be in the vicinity of the steam inlet 10a.

Note, here, that in the production device 100, the space Q having the saturated steam atmosphere in the expansion cylinder 10 is a different space from the space inside the branch cylinder 21. More specifically, the expansion cylinder 10 is provided outside the branch cylinder 21. Thus, the space Q having the saturated steam atmosphere in the expansion cylinder 10 is isolated from the space inside the branch cylinder 21.

In the conventional expanded particle production device used in a factory or the like place, resin particles impregnated with a blowing agent were expelled into a part of a space in the transport wind circulation line 20, for example, a space in the branch cylinder 21. Thus, in order to expel the resin particles impregnated with the blowing agent into a space of a saturated steam atmosphere, the entire transport wind circulation line 20 needed to be configured to have a space of saturated steam. Therefore, it is necessary to block the transport wind circulation line 20 from outside so that the transport wind circulation line 20 becomes a closed system. This leads to a complicated and large-size structure of the production device and increases the facility cost.

In contrast, in the production device 100 in accordance with one or more embodiments, the expansion cylinder 10 into which the resin particles impregnated with the blowing agent are expelled has a different space from a space in the transport wind circulation line 20. Thus, instead of the space in the entire transport wind circulation line 20, the space Q in the expansion cylinder 10 is configured as a space of the saturated steam atmosphere. This allows the transport wind circulation line 20 to be an open system that is open from outside, without configuring the transport wind circulation line 20 as a closed system. Thus, according to the production device 100, it is possible to realize pressure-release expansion in a high temperature steam atmosphere with a simple structure. Therefore, by the pressure-release expansion method, it is possible to produce expanded particles having a high expansion ratio with a simpler structure.

Further, according to the production device 100 in accordance with one or more embodiments, the cylinder body 11 of the expansion cylinder 10 is cylindrical, and has the reducer part 11b in which the distance between the side walls facing each other decreases with increasing proximity to the connecting port 10b. As a result, the cylinder body 11 is shaped in a reducer such that the diameter of the cylinder body 11 decreases with increasing proximity to the connecting port 10b. This limits outflow of steam through the connecting port 10b and makes the steam likely to build up in the expansion cylinder 10. This increases the chance of contact between the expanded particles P and the steam in the expansion cylinder 10. Therefore, it is possible to obtain expanded particles P having a high expansion ratio.

Further, according to the production device 100, the expansion cylinder 10 is provided outside the branch cylinder 21. In addition, the expansion cylinder 10 includes the connection piping 13 connected to the branch cylinder 21, and includes an uneven surface 13a on at least the inner wall of the connection piping 13. With the connection piping 13 provided in this manner, it is possible to extend a distance from the cylinder body 11 to the connecting port 10b by the length of the connection piping 13. This prolongs a time of contact between the expanded particles P and steam. Further, since the uneven surface 13a is provided on at least the inner wall of the connection piping 13, the expanded particles P inside the expansion cylinder 10 irregularly collide inside the connection piping 13 and reach the connecting port 10b. As a result, it takes a long time for the expanded particles P to reach the connecting port 10b while the expanded cells are formed by the impactive force caused by the collision. This prolongs the time of contact between the expanded particles P and steam. Since the time of contact between the expanded particles P and steam is prolonged in this manner, it is possible to obtain the expanded particles P having a high expansion ratio.

Note that the uneven surface 13a only needs to be formed on at least the inner wall of the connection piping 13, provided that the effect of prolonging the time of contact between the expanded particles P and steam is yielded. The uneven surface 13a may be formed on the inner wall of the cylinder body 11.

Further, the connection piping 13 only needs to be configured such that the expanded particles P irregularly collide inside the connection piping 13, and may have, for example, a structure in which repeated bends are made by straight piping and curved piping both of which have a smooth inner surface.

Further, the expansion cylinder 10 can be used as an optional facility of the existing expanded particle production facility. The production device 100 in accordance with one or more embodiments can also encompass an existing production facility in which the expansion cylinder 10 is provided as an optional facility in such a manner.

(Method for Producing Expanded Particles)

A method for producing expanded particles in accordance with one or more embodiments includes an impregnation process, an expansion process, and a transport process. In the impregnation process and the expansion process, crystalline thermoplastic resin particles are impregnated with a blowing agent in a pressure-resistant vessel under a condition where heat and pressure are applied (impregnation process), and then the thermoplastic resin particles impregnated with the blowing agent are expelled into an expansion chamber having a pressure lower than an internal pressure of the pressure-resistant vessel, so that thermoplastic resin expanded particles are obtained (expansion process). Further, in the transport process, the thermoplastic resin expanded particles are transported through open-system transport piping. In the production method in accordance with one or more embodiments, the expansion chamber is provided with a connecting port connecting with the transport piping and has a space of a saturated steam atmosphere. This space of a saturated steam atmosphere is a different space from a space inside the transport piping. Further, control is performed such that a first temperature inside the expansion chamber exceeds 102° C. and is not higher than a higher one of 108° C. and a temperature obtained by a melting point Tm of the thermoplastic resin minus 14° C., a second temperature at the connecting port is not lower than 100° C., and the first temperature is higher than the second temperature. Examples of such a production method include a method for producing expanded particles with use of the production device 100 illustrated in FIG. 1. Note that regarding the details of this production method, the above description of the production device will be basically incorporated, and only non-overlapping parts will be described below.

The production method in accordance with one or more embodiments may be such that the expansion process includes a process of expelling the thermoplastic resin particles impregnated with the blowing agent into a cylindrical expansion cylinder 10 that has the reducer part in which a distance between side walls of the reducer part 11*b* facing each other decreases with increasing proximity to the connecting port 10*b*. This makes steam likely to build up in the expansion cylinder 10. This increases the chance of contact between the expanded particles P and steam in the expansion cylinder 10. Therefore, it is possible to obtain expanded particles having a high expansion ratio.

Further, in a case where the expansion cylinder 10 is provided outside the branch cylinder 21 and the transport wind circulation line 20, and the expansion cylinder 10 includes the connection piping 13 connected to the branch cylinder 21 and includes the uneven surface 13*a* on at least the inner wall of the connection piping 13, it is preferable that the expansion process includes the following process. That is, preferably, the expansion process includes a process of expelling the thermoplastic resin particles impregnated with the blowing agent into the expansion cylinder 10 to which the connection piping 13 is connected. This prolongs the time of contact between the expanded particles and steam, and thus makes it possible to obtain the expanded particles having a high expansion ratio.

Further, the production method in accordance with one or more embodiments may include a drying process of drying expanded particles with use of the dryer 33, and the transport process includes a process of transporting the expanded particles through the transport wind circulation line 20 that serves as the transport piping and circulates air in the dryer 33. The moist hot wind in the dryer 33 is utilized for transport of the expanded particles in this manner, so that the effects of energy saving and prevention of bead shrinkage are obtained.

Further, the production method in accordance with one or more embodiments may be such that the expansion process includes a process of expelling the thermoplastic resin particles impregnated with the blowing agent so that the thermoplastic resin particles collide with the side wall surface of the expansion cylinder 10. This allows the individual expanded particles P to be uniformly expanded and makes it possible to reduce variations in expansion ratio.

(Raw Materials for Expanded Particles P)

In one or more embodiments, as raw materials for producing the expanded particles P (hereinafter may also be referred to simply as "expanded particles"), in addition to the crystalline thermoplastic resin and the blowing agent, various additives can be added as necessary. Examples of the additives include flame retardants, thermal stabilizers, radical generators, processing aids, weathering stabilizers, nucleating agents, expansion aids, antistatic agents, radiative heat transfer inhibitors, colorants, and the like. These additives may be used alone or in combination of two or more thereof.

Further, the thermoplastic resin used in one or more embodiments is not particularly limited as long as it is a generally known crystalline thermoplastic resin having expandability. Examples of the thermoplastic resin include a polyolefin-based resin, a polyester-based resin, a polyphenylene ether-based resin, a polyamide-based resin, and mixtures thereof. The thermoplastic resin may be a polyolefin-based resin or a polyester-based resin.

Examples of the polyester-based resin include aliphatic polyester resins, aromatic polyester resins, and aliphatic-aromatic polyester resins. Specific examples of the polyester-based resin include polyhydroxyalkanoates, polybutylene succinate (PBS), poly(butylene adipate-co-terephthalate) (PBAT), and polyethylene terephthalate (PET). Furthermore, examples of the polyhydroxyalkanoates include at least one kind selected from the group consisting of poly(3-hydroxybutyrate-co-3-hydroxyhexanoate) (PHBH), poly(3-hydroxybutyrate) (P3HB), poly(3-hydroxybutyrate-co-3-hydroxyvalerate) (PHBV), poly(3-hydroxybutyrate-co-4-hydroxybutyrate) (P3HB4HB), poly(3-hydroxybutyrate-co-3-hydroxyoctanoate), and poly(3-hydroxybutyrate-co-3-hydroxyoctadecanoate).

The polyolefin-based resin is not particularly limited, and examples thereof include polypropylene-based resins and polyethylene-based resins. Specific examples of a monomer of the polyolefin-based resin (hereinafter may also be referred to as an "olefin-based monomer") include α-olefins having 2 to 12 carbon atoms, such as ethylene, propylene, butene-1, isobutene, pentene-1, 3-methyl-butene-1, hexene-1, 4-methyl-pentene-1, 3,4-dimethyl-butene-1, heptene-1, 3-methyl-hexene-1, octene-1, and decene-1. These monomers can be used alone, or two or more of these monomers can be used in combination.

Examples of other monomer(s) copolymerizable with the olefin-based monomer include: cyclic olefins such as cyclopentene, norbornene, and 1,4,5,8-dimethano-1,2,3,4,4a,8,8a,6-octahydronaphthalene; and dienes such as 5-methylene-2-norbornene, 5-ethylidene-2-norbornene, 1,4-hexadiene, methyl-1,4-hexadiene, and 7-methyl-1,6-ooctadiene. These monomers can be used alone, or two or more of these monomers can be used in combination.

Specific examples of the polyolefin-based resin include: polyethylene-based resins each containing ethylene as a main component, such as high-density polyethylene, intermediate-density polyethylene, low-density polyethylene, and linear low-density polyethylene; and polypropylene-based resins each containing polypropylene as a main component. These polyolefin-based resins can be used alone, or two or more of these polyolefin-based resins can be used in combination.

Among these polyolefin-based resins, any of the polyethylene-based resins each containing ethylene as a main component is particularly effective in the production method in accordance with one or more embodiments. In particular, a polypropylene-based resin containing ethylene, which is an α-olefin, as a copolymerizable monomer component is easily available and is easily processable or moldable.

The polypropylene-based resins are not particularly limited provided that the polypropylene-based resins each contain propylene as a main component of the monomer.

Examples of the polypropylene-based resins include a propylene homopolymer, an α-olefin-propylene random copolymer, and an α-olefin-propylene block copolymer. These polypropylene-based resins can be used alone, or two or more of these polypropylene-based resins can be used in combination.

Examples of the blowing agent include volatile hydrocarbon-based blowing agents such as propane, isobutane, butane, pentane, and hexane; inorganic gases such as air, nitrogen, and carbon dioxide; and water. An inorganic gas that is used as the blowing agent may be carbon dioxide because carbon dioxide makes it possible to easily obtain expanded particles expanded at a relatively high expanding ratio. These blowing agents can be used alone, or two or more of these blowing agents can be used in combination.

In the production device 100 in accordance with one or more embodiments, as described above, the space of the saturated steam atmosphere in the expansion cylinder 10 is a different space from the space inside the branch cylinder 21. The configuration of the "different space" here means a configuration in which the space in the expansion cylinder 10 and the space in the branch cylinder 21 are separated. The configuration of the "different space" is not limited to the configuration, as illustrated in FIG. 2, in which the expansion cylinder 10 is provided outside the branch cylinder 21. For example, the configuration of the "different space" may be a configuration in which the expansion cylinder is formed in the space in the transport wind circulation line 20 (for example, the space in the branch cylinder 21). In this case, the space in the expansion cylinder 10 and the space in the branch cylinder 21 are separated by a wall part constituting the expansion cylinder 10. The following will describe variations of the expansion cylinder 10.

(Variation 1)

Figure 3:
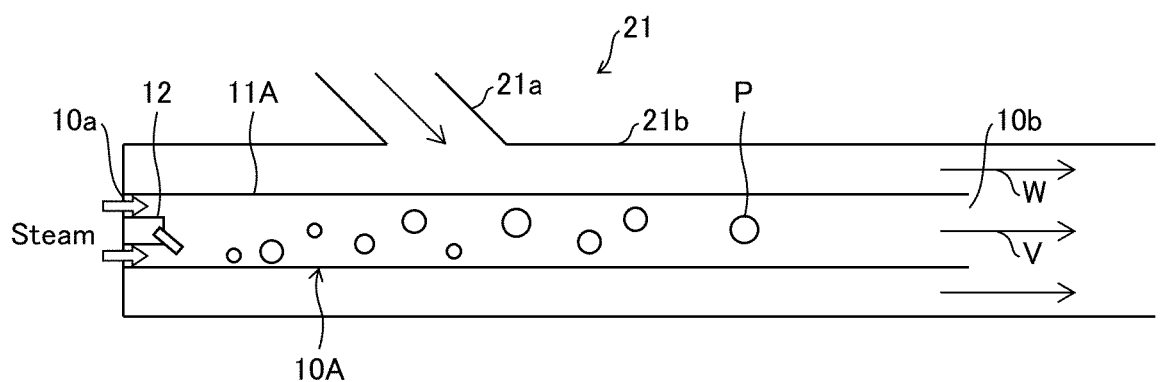
FIG. 3 is a cross-sectional view schematically illustrating a configuration of a variation of the expansion cylinder used in one or more embodiments of the present invention.

FIG. 3 is a cross-sectional view illustrating a configuration of a variation of the expansion cylinder used in one or more embodiments.

As illustrated in FIG. 3, the branch cylinder 21 has a branch flow path 21a and a main flow path 21b. The expansion cylinder 10A as Variation 1 is disposed in the main flow path 21b of the branch cylinder 21. Further, the expansion cylinder 10A includes a cylindrical cylinder body 11A. Further, the steam inlet 10a is configured such that steam is injected along the axis of the expansion cylinder 10. Furthermore, the expansion cylinder 10A is configured such that a pressure in the expansion cylinder 10A due to steam V flowing into the expansion cylinder 10A through the connecting port 10b is higher than a pressure of transport wind W. This makes it possible to prevent the expanded particles P from flowing back to the cylinder body 11A due to the transport wind W.

(Variation 2)

Figure 4:
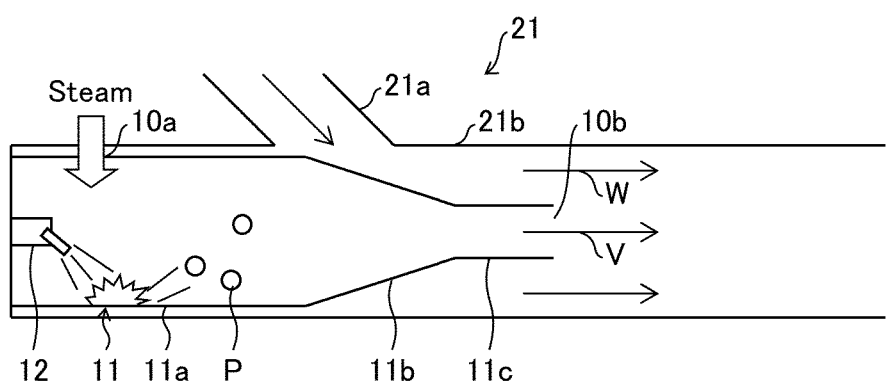
FIG. 4 is a cross-sectional view schematically illustrating a configuration of another variation of the expansion cylinder used in one or more embodiments of the present invention.

FIG. 4 is a cross-sectional view illustrating a configuration of another variation of the expansion cylinder used in one or more embodiments.

As illustrated in FIG. 4, in Variation 2, the expansion cylinder 10 illustrated in FIG. 2 is disposed in the main flow path 21b of the branch cylinder 21. That is, in Variation 2, the expansion cylinder 10 is not provided outside the branch cylinder 21, but is provided inside the branch cylinder 21. Furthermore, the expansion cylinder 10 is configured such that a pressure in the expansion cylinder 10 due to steam V flowing into the expansion cylinder 10 through the connecting port 10b is higher than a pressure of transport wind W. This makes it possible to prevent the expanded particles P from flowing back to the cylinder body 11 due to the transport wind W.

Embodiment 2

Figure 5:
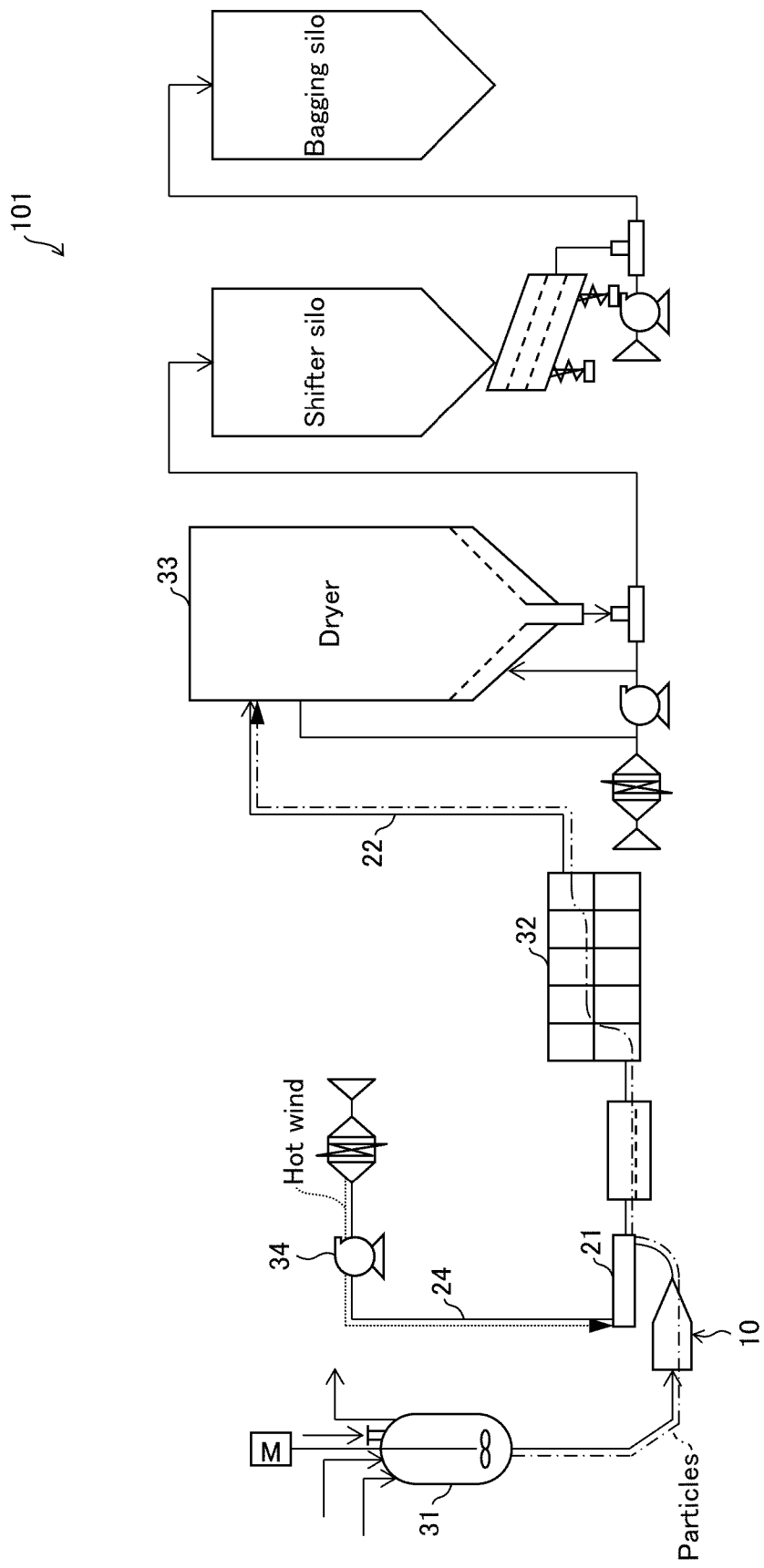
FIG. 5 is a view schematically illustrating a configuration of a device for producing expanded particles in accordance with one or more embodiments of the present invention.

The following description will discuss one or more embodiments of the present invention. Note that, for convenience, members having functions identical to those of the respective members of the foregoing embodiments are given respective identical reference numerals, and a description of those members is not repeated. FIG. 5 is a view schematically illustrating a configuration of a production device 101 in accordance with one or more embodiments.

Unlike Embodiment 1, the production device 101 in accordance with one or more embodiments does not include the transport pipe 23, as illustrated in FIG. 5. The production device 101 includes the branch cylinder 21, the transport pipe 22, and the transport pipe 24. The transport pipe 22 is piping that connects the dehydrator 32 and the dryer 33. The transport pipe 24 is piping that connects the transport blower 34 and the branch cylinder 21. Further, the expansion cylinder 10 is connected to the branch cylinder 21. In the production device 101, transport wind from outside is sucked into the transport pipe 24 by the transport blower 34. Then, the transport wind passes through the branch cylinder 21 and the transport pipe 22 and flows into the dryer 33. The production device 101 in accordance with one or more embodiments is preferable since it has a simpler facility configuration than that of Embodiment 1, and has an advantage in that the facility cost is low.

One or more embodiments of the present invention are not limited to the embodiments, but can be altered by a skilled person in the art within the scope of the claims. One or more embodiments the present invention also encompass, in their technical scope, any embodiments derived by combining technical means disclosed in differing embodiments. Further, it is possible to form a new technical feature by combining the technical means disclosed in the respective embodiments.

A production device 100 in accordance with a first aspect of one or more embodiments of the present invention is a production device 100 for producing expanded particles P, the production device 100 being configured to include: a pressure-resistant vessel 31 for impregnating crystalline thermoplastic resin particles with a blowing agent; an expansion chamber (expansion cylinder 10) having a pressure lower than an internal pressure of the pressure-resistant vessel 31; and open-system transport piping (branch cylinder 21, transport wind circulation line 20) that transports the expanded particles, the expansion chamber being provided with a connecting port 10b that connects with the transport piping and having a space of a saturated steam atmosphere, the space being a different space from a space inside the transport piping, wherein a first temperature (temperature T1) inside the expansion chamber exceeds 102° C. and is not higher than a higher one of 108° C. and a temperature obtained by a melting point Tm of a thermoplastic resin minus 14° C., a second temperature (temperature T2) at the connecting port 10b is not lower than 100° C., and the first temperature is higher than the second temperature.

In a second aspect of one or more embodiments of the present invention, the production device 100 is configured such that, in the first aspect of one or more embodiments the present invention, the expansion chamber (expansion cylinder 10) is cylindrical and has a reducer part (reducer part 11b) in which a distance between side walls facing each other decreases with increasing proximity to the connecting port 10b.

In a third aspect of one or more embodiments the present invention, the production device 100 is configured such that, in the first or second aspect of one or more embodiments of the present invention, the expansion chamber (expansion cylinder 10) is provided outside the transport piping (branch cylinder 21, transport wind circulation line 20), and the expansion chamber includes connection piping 13 connected to the transport piping and includes an uneven surface 13a on at least an inner wall of the connection piping 13.

In a fourth aspect of one or more embodiments of the present invention, the production device 100 is configured such that, in any of the first to third aspects of one or more embodiments of the present invention, the production device 100 includes a dryer 33 that dries the expanded particles P, and the transport piping constitutes a circulation line (transport wind circulation line 20) that circulates air in the dryer.

In a fifth aspect of one or more embodiments of the present invention, the production device 100 is configured such that, in any of the first to fourth aspects of one or more embodiments of the present invention, the production device 100 includes a particle expelling section (orifice plate 12) that expels the thermoplastic resin particles impregnated with the blowing agent into the expansion chamber (expansion cylinder 10), and the particle expelling section expels the thermoplastic resin particles so that the thermoplastic resin particles collide with a side wall surface of the expansion chamber.

A method in accordance with a sixth aspect of one or more embodiments of the present invention is a method for producing expanded particles P, including: an impregnation process of impregnating crystalline thermoplastic resin particles with a blowing agent in a pressure-resistant vessel 31 under a condition where heat and pressure are applied; an expansion process of expelling the blowing agent-impregnated thermoplastic resin particles obtained in the impregnation process into an expansion chamber (expansion cylinder 10) having a pressure lower than an internal pressure of the pressure-resistant vessel 31, so that expanded particles P are obtained; and a transport process of transporting the expanded particles P through open-system transport piping (branch cylinder 21, transport wind circulation line 20), the expansion chamber being provided with a connecting port 10b that connects with the transport piping and having a space of a saturated steam atmosphere, the space being a different space from a space inside the transport piping, wherein a first temperature (temperature T1) inside the expansion chamber exceeds 102° C. and is not higher than a higher one of 108° C. and a temperature obtained by a melting point Tm of a thermoplastic resin minus 14° C., a second temperature at the connecting port 10b is not lower than 100° C., and the first temperature is higher than the second temperature.

In a seventh aspect of one or more embodiments of the present invention, the production method is a method such that, in the sixth aspect, the expansion process includes a process of expelling the thermoplastic resin particles impregnated with the blowing agent into the expansion chamber (expansion cylinder 10), the expansion chamber being cylindrical and having a reduced part (reducer part 11b) in which a distance between side walls facing each other decreases with increasing proximity to the connecting port 10b.

In an eighth aspect of one or more embodiments of the present invention, the production method is a method such that, in the sixth or seventh aspect, the expansion chamber (expansion cylinder 10) is provided outside the transport piping (branch cylinder 21, transport wind circulation line 20), the expansion chamber includes connection piping 13 connected to the transport piping and includes an uneven surface 13a on at least an inner wall of the connection piping, and the expansion process includes a process of expelling the thermoplastic resin particles impregnated with the blowing agent into the expansion chamber.

In a ninth aspect of one or more embodiments of the present invention, the production method is a method such that, in any of the sixth to eighth aspects, the production method includes a drying process of drying the expanded particles P with use of a dryer 33, and the transport process includes a process of transporting the expanded particles P through a circulation line (transport wind circulation line 20) that serves as the transport piping and circulates air in the dryer.

In a tenth aspect of one or more embodiments of the present invention, the production method is a method such that, in any of the sixth to ninth aspects, the expansion process includes a process of expelling the thermoplastic resin particles impregnated with the blowing agent so that the thermoplastic resin particles collide with a side wall surface of the expansion chamber (expansion cylinder 10).

EXAMPLES

Examples 1 to 5 and Comparative Example 1

With use of the production device 100 illustrated in FIG. 1, polyethylene-based resin expanded particles were produced on the scale of an actual production facility. Polyethylene-based resin expanded particles are usually produced by two-stage expansion. The device configuration of the production device 100 and the expansion conditions are as shown in Table 1. As the temperature T1, a temperature in the vicinity of the orifice plate 12 in the expansion cylinder 10 was measured. Further, as the temperature T2, a temperature in the vicinity of the connecting port 10b was measured.

Then, the expansion ratio of the produced expanded particles was evaluated. The results are shown in Table 1. "G" in Table 1 means that expanded particles have an expansion ratio of not less than 10 times and are good. Further, "P" means that expanded particles have an expansion ratio of less than 10 times and are poor.

TABLE 1

| Categories | Items | Units | Comparative Example 1 | Example 1 | Example 2 | Example 3 | Example 4 | Example 5 |
|---|---|---|---|---|---|---|---|---|
| Expansion facility | Facility scale | | Production facility | Production facility | Production facility | Production facility | Production facility | Production facility |
| Expansion method | Transport wind circulation line 20 | | Open system | Open system | Open system | Open system | Open system | Open system |
| | Capacity of pressure-resistant vessel 31 | L | 3000 | 3000 | 3000 | 3000 | 3000 | 3000 |

TABLE 1-continued

| Categories | Items | Units | Comparative Example 1 | Example 1 | Example 2 | Example 3 | Example 4 | Example 5 |
|---|---|---|---|---|---|---|---|---|
| | Cylinder diameter of large-diameter cylinder part 11a | mm | φ261 | φ261 | φ261 | φ261 | φ261 | φ261 |
| | Length of large-diameter cylinder part 11a | mm | 630 | 630 | 630 | 630 | 630 | 630 |
| | Length of reducer part 11b | mm | 525 | 525 | 525 | 525 | 525 | 525 |
| | Diameter of small-diameter cylinder part 11c | mm | φ110 | φ110 | φ110 | φ110 | φ110 | φ110 |
| | Length of small-diameter cylinder part 11c | mm | 455 | 455 | 455 | 455 | 455 | 455 |
| | Connection piping 13 | | Flexible hose | Flexible hose | Flexible hose | Flexible hose | Flexible hose | Flexible hose |
| | Length of connection piping 13 | mm | 1500 | 1500 | 1500 | 1500 | 1500 | 1500 |
| | Diameter of connecting port 10b | mm | φ110 | φ110 | φ110 | φ110 | φ110 | φ110 |
| | Diameter of discharge port 14a | mm | φ72 | φ72 | φ72 | φ72 | φ72 | φ72 |
| Expansion condition | Blowing rate of steam | Kg/hr | 60 | 130 | 130 | 200 | 270 | 330 |
| | Expansion time | min | 22 | 22 | 22 | 22 | 22 | 22 |
| | Collision with wall surface | | Yes | Yes | Yes | Yes | Yes | Yes |
| | Temperature of transport wind | °C. | 60 | 60 | 60 | 60 | 60 | 60 |
| | Temperature T1 | °C. | 102 | 103 | 104 | 105 | 107 | 108 |
| | Temperature T2 | °C. | 99 | 101 | 102 | 103 | 105 | 106 |
| | Atmosphere of expansion cylinder 10 | | Saturated steam | Saturated steam | Saturated steam | Saturated steam | Saturated steam | Saturated steam |
| | Backflow of transport wind into expansion cylinder 10 | | No | No | No | No | No | No |
| | Time of contact with steam | | Long | Long | Long | Long | Long | Long |
| Expanded particles | DSC ratio | % | 27 | 28 | 32 | 25 | 27 | 27 |
| | Cell diameter | μm | | 170 | 170 | 170 | | |
| | Expansion ratio | Time | 9.0 | 10.9 | 10.0 | 10.7 | 11.0 | 11.3 |
| | (GIP evaluation) | | (P) | (G) | (G) | (G) | (G) | (G) |

As shown in Table 1, in Examples 1 to 5, the expanded particles are produced under the following conditions: (i) the temperature T1 exceeds 102° C. and is not higher than 108° C.; (ii) the temperature T2 is not lower than 100° C.; and (iii) the temperature T1 is higher than the temperature T2. From the results in Table 1, in Examples 1 to 5, the expansion ratio of the expanded particles was not less than 10 times, and the expanded particles having a high expansion ratio could be obtained.

In contrast, in Comparative Example 1, the temperature T1 is 102° C., and the temperature T2 is 99° C. Therefore, the expansion condition in Comparative Example 1 deviates from the above conditions (i) and (ii). In Comparative Example 1, the expansion ratio was 9 times, and expanded particles having a high expansion ratio could not be obtained.

Further, in Examples 4 and 5, the expansion conditions satisfy the above conditions (i) to (iii) as in Examples 1 to 3. In Examples 4 and 5, the expanded particles having a high expansion ratio (expansion ratio of not less than 11 times) could be obtained.

REFERENCE SIGNS LIST 10, 10A expansion cylinder (expansion chamber)
10b connecting port
11b reducer part (reducer part)
12 orifice plate equipped with tubes (particle expelling section)
13 connection piping
13a uneven surface
20 transport wind circulation line (circulation line)
21 branch cylinder (transport piping)
21a branch flow path (transport piping)
21b main flow path (transport piping)
22, 23, 24 transport pipe (transport piping)
31 pressure-resistant vessel
33 dryer
100, 101 production device
T1 temperature (first temperature)
T2 temperature (second temperature)
Q space (space of saturated steam atmosphere)

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

What is claimed is:

1. A method for producing expanded particles, comprising:
   an impregnation process of impregnating crystalline thermoplastic resin particles with a blowing agent in a pressure-resistant vessel under a condition where heat and pressure are applied;
   an expansion process of expelling a blowing agent-impregnated thermoplastic resin particles obtained in the impregnation process into an expansion chamber having a pressure lower than an internal pressure of the pressure-resistant vessel, so that the expanded particles are obtained; and
   a transport process of transporting the expanded particles through an open-system transport piping,
   the expansion chamber being provided with a connecting port that connects with the transport piping and having a space of a saturated steam atmosphere, the space different from a space inside the transport piping,
   wherein a transport wind circulates in the transport piping, and the transport wind does not flow into the space of the saturated steam atmosphere in the expansion chamber,
   wherein a first temperature inside the expansion chamber exceeds 102° C. and is not higher than a higher one of 108° C. and a temperature obtained by a melting point Tm of a thermoplastic resin minus 14° C., a second temperature at the connecting port is not lower than 100° C., and the first temperature is higher than the second temperature.

2. The method according to claim 1, wherein the expansion chamber is provided outside the transport piping, and the expansion chamber includes connection piping connected to the transport piping and includes an uneven surface on at least an inner wall of the connection piping.

3. The method according to claim 1, wherein the method includes a drying process of drying the expanded particles with a dryer, and the transport process includes a process of transporting the expanded particles through a circulation line that serves as the transport piping and circulates air in the dryer.

4. The method according to claim 1, wherein the expansion process includes the process of expelling the thermoplastic resin particles impregnated with the blowing agent so that the thermoplastic resin particles collide with a side wall surface of the expansion chamber.

5. The method according to claim 1, wherein the expansion chamber is cylindrical and has a reducer part in which a distance between side walls facing each other decreases with increasing proximity to the connecting port.

6. The method according to claim 5, wherein the expansion chamber which is cylindrical and the reducer part are arranged in a lateral direction.

* * * * *